(12) United States Patent
Ide

(10) Patent No.: US 10,784,718 B2
(45) Date of Patent: Sep. 22, 2020

(54) MONITORING SYSTEM, MONITORING APPARATUS, SERVER, AND MONITORING METHOD

(71) Applicant: SHARP KABUSHIKI KAISHA, Sakai, Osaka (JP)

(72) Inventor: Hisashi Ide, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 289 days.

(21) Appl. No.: 16/107,003

(22) Filed: Aug. 21, 2018

(65) Prior Publication Data
US 2019/0081507 A1 Mar. 14, 2019

(30) Foreign Application Priority Data
Sep. 8, 2017 (JP) .................. 2017-173515

(51) Int. Cl.
| | |
|---|---|
| H02J 13/00 | (2006.01) |
| H02J 7/00 | (2006.01) |
| G06F 9/54 | (2006.01) |
| H02J 7/02 | (2016.01) |
| G05B 19/042 | (2006.01) |
| G05B 15/02 | (2006.01) |

(52) U.S. Cl.
CPC .......... *H02J 13/0075* (2013.01); *G05B 15/02* (2013.01); *G05B 19/0428* (2013.01); *G06F 9/542* (2013.01); *H02J 7/0047* (2013.01); *H02J 7/027* (2013.01); *H02J 7/0048* (2020.01); *H02J 13/00002* (2020.01); *H02J 13/0004* (2020.01)

(58) Field of Classification Search
USPC ......................................... 702/62
See application file for complete search history.

(56) References Cited

U.S. PATENT DOCUMENTS

| | | | |
|---|---|---|---|
| 2012/0100828 A1* | 4/2012 | Leblanc ................ | H04M 19/04 455/404.2 |
| 2016/0036958 A1* | 2/2016 | Logan ................... | H04W 68/00 455/414.1 |
| 2017/0105190 A1* | 4/2017 | Logan ..................... | H04W 4/14 |
| 2017/0359192 A1* | 12/2017 | Patterson ............... | G08C 23/02 |

FOREIGN PATENT DOCUMENTS

JP 2012-039768 A 2/2012

* cited by examiner

*Primary Examiner* — Paul D Lee
(74) *Attorney, Agent, or Firm* — ScienBiziP, P.C.

(57) ABSTRACT

Provided is a monitoring apparatus that obtains, on an as-needed basis, audio data containing a notification sound emitted by an electrical appliance. A monitoring system (1) for monitoring the state of an electrical apparatus (400) which is to be monitored includes a monitoring apparatus (100) configured to (i) measure electric current consumed by the electrical appliance and obtain a notification sound that the electrical appliance emits during a predetermined sound recording period from when a predetermined change in the electric current is detected. The monitoring system (1) is configured to carry out a determination of the state of the electrical appliance from the notification sound and send report information, which is indicative of a result of the determination, to a communication terminal (300).

10 Claims, 9 Drawing Sheets

FIG. 5

| ITEMS OF INFORMATION IN RECORDED AUDIO DATA DATABASE | | | | RESULT OF DETERMINATION |
|---|---|---|---|---|
| ID OF MONITORING APPARATUS | TYPE OF APPLIANCE | DATE AND TIME OF RECORDING | RECORDED AUDIO DATA | ID OF MATCHED SOUND PATTERN |
| S001 | XX-YY01 | 2017/7/1 10:05 | SOUND 1 | A (SOUND INDICATING END OF APPLIANCE'S OPERATION) |
| S001 | | 2017/7/2 10:05 | SOUND 2 | B (SOUND INDICATING ERROR OF APPLIANCE) |
| S001 | | 2017/7/3 10:05 | SOUND 3 | NO MATCHED SOUND PATTERN |
| S001 | | | | |
| S002 | | | | |
| S003 | | | | |

221

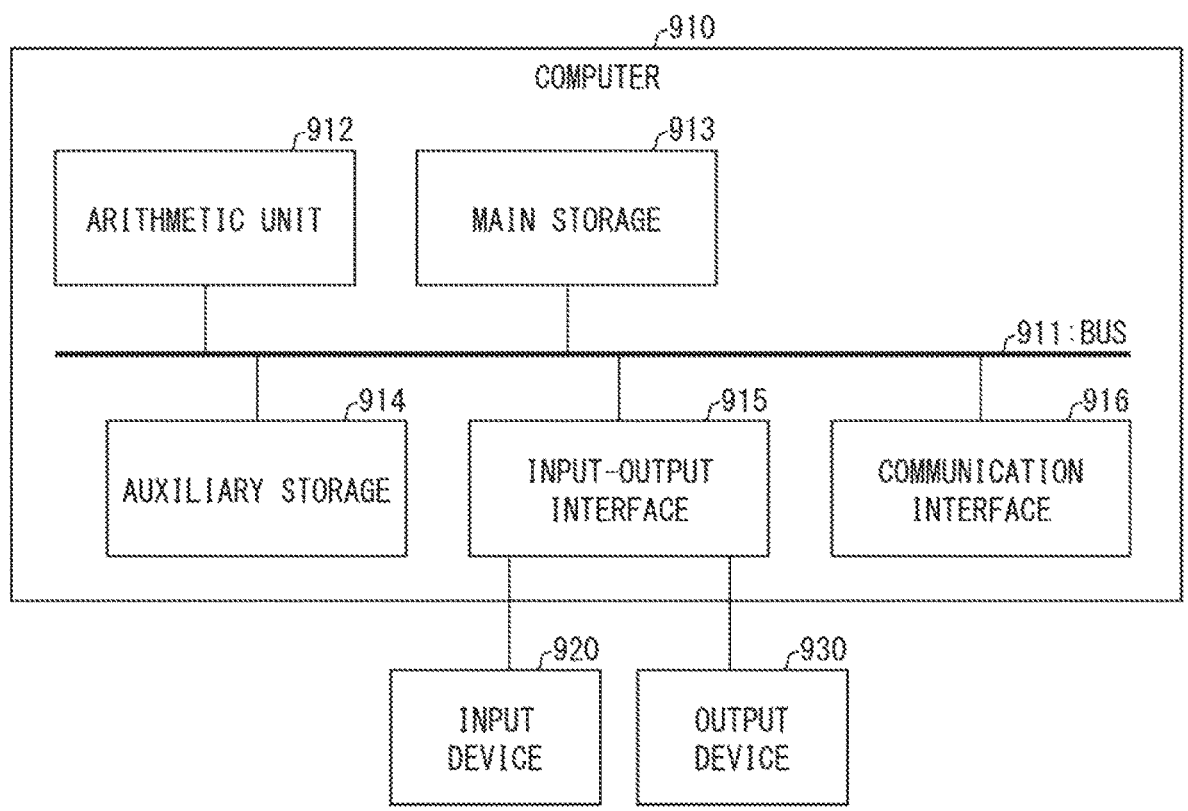

MONITORING SYSTEM, MONITORING APPARATUS, SERVER, AND MONITORING METHOD

This Nonprovisional application claims priority under 35 U.S.C. § 119 on Patent Application No. 2017-173515 filed in Japan on Sep. 8, 2017, the entire contents of which are hereby incorporated by reference.

TECHNICAL FIELD

The present invention relates to a monitoring system, a monitoring apparatus, a server, and a monitoring method, each of which is to monitor the operational state of an electrical appliance.

BACKGROUND ART

Conventional techniques, including an apparatus or a system for assessing the operational state of an electrical appliance from various kinds of information measured on the electrical appliance, have been known. For example, Patent Literature 1 discloses a device failure assessment system to assess the state of a customer device on the basis of an electrical signal and an acoustic signal measured at the customer device and to thereby estimate a failure or abnormality.

CITATION LIST

Patent Literature

Patent Literature 1

Japanese Patent Application. Publication, Tokukai, No. 2012-39768 (Publication date: Feb. 23, 2012)

SUMMARY OF INVENTION

Technical Problem

The invention in accordance with Patent Literature 1 is configured such that an electrical signal and an acoustic, signal are measured in regard to a customer device and thereby the state of the customer device is assessed. This necessitates full-time operation of a structure for measuring the electrical signal and the acoustic signal, and thus makes it difficult to reduce electric current consumption. Furthermore, the invention in accordance with Patent Literature 1 has no means to prove that the measured acoustic signal is derived from a sound emitted by the customer device, and thus it is highly likely that an acoustic signal from some other apparatus near the customer device may be falsely recognized.

One aspect of the present invention was made in view of the above issue, and an object thereof is to provide a monitoring apparatus that obtains, on an as-needed basis, audio data containing a notification sound emitted by an electrical appliance.

Solution to Problem

In order to attain the above object, a monitoring system in accordance with one aspect of the present invention is a monitoring system for monitoring a state of an electrical appliance which is to be monitored, the monitoring system including: a monitoring apparatus configured to (i) measure electric current consumed by the electrical appliance and (ii) obtain a notification sound that the electrical appliance emits within a predetermined sound recording period which starts when a predetermined change in the electric current is detected, the monitoring system being configured to carry out a determination of the state of the electrical appliance from the notification sound obtained by the monitoring apparatus and send report information, which is indicative of a result of the determination, to a communication terminal associated with the monitoring apparatus.

In order to attain the above object, a monitoring apparatus in accordance with another aspect of the present invention is a monitoring apparatus for detecting a state of an electrical appliance which is to be monitored, the monitoring apparatus including: an electric current measuring section configured to measure electric current consumed by the electrical appliance; an electric current change detecting section configured to detect predetermined change in the electric current; a microphone configured to obtain a notification sound that the electrical appliance emits within a predetermined sound recording period which starts when the predetermined change is detected; and a transmitting section configured to transmit audio data containing the notification sound to a server.

In order to attain the above object, a monitoring apparatus in accordance with a further aspect of the present invention is a monitoring apparatus for detecting a state of an electrical appliance which is to be monitored, the monitoring apparatus including: an electric current measuring section configured to measure electric current consumed by the electrical appliance; an electric current change detecting section configured to detect a predetermined change in the electric current; a microphone configured to obtain a notification sound that the electrical appliance emits within a predetermined sound recording period which starts when the predetermined change is detected; an apparatus's sound checking section configured to carry out a determination of the state of the electrical appliance from the notification sound; and a transmitting section configured to transmit report information, which is indicative of a result of the determination, to an external apparatus.

In order to attain the above object, a monitoring method for use in a monitoring apparatus in accordance with still a further aspect of the present invention is a monitoring method using a monitoring apparatus for detecting a state of an electrical appliance which is to be monitored, the method including: an electric current measuring step including measuring electric current consumed by the electrical appliance; an electric current change detecting step including detecting a predetermine change in the electric current; a notification sound obtaining step including obtaining a notification sound that the electrical appliance emits within a predetermined sound recording period which starts when the predetermined change is detected; and a transmitting step including transmitting audio data containing the notification sound to a server.

Advantageous Effects of Invention

One aspect of the present invention brings about an effect of making it possible to provide, for example, a monitoring apparatus that obtains, on an as--needed basis, audio data containing a notification sound emitted by an electrical appliance.

BRIEF DESCRIPTION OF DRAWINGS

FIG. 5 is a table showing one example of a determination of state carried out by a server in accordance with Embodiment 1 of the present invention.

FIG. 9 is a block diagram exemplarily illustrating a configuration of a computer that can be used as a monitoring apparatus or a server of any of Embodiments 1 to 4.

DESCRIPTION OF EMBODIMENTS

Embodiment 1

Figure 1:
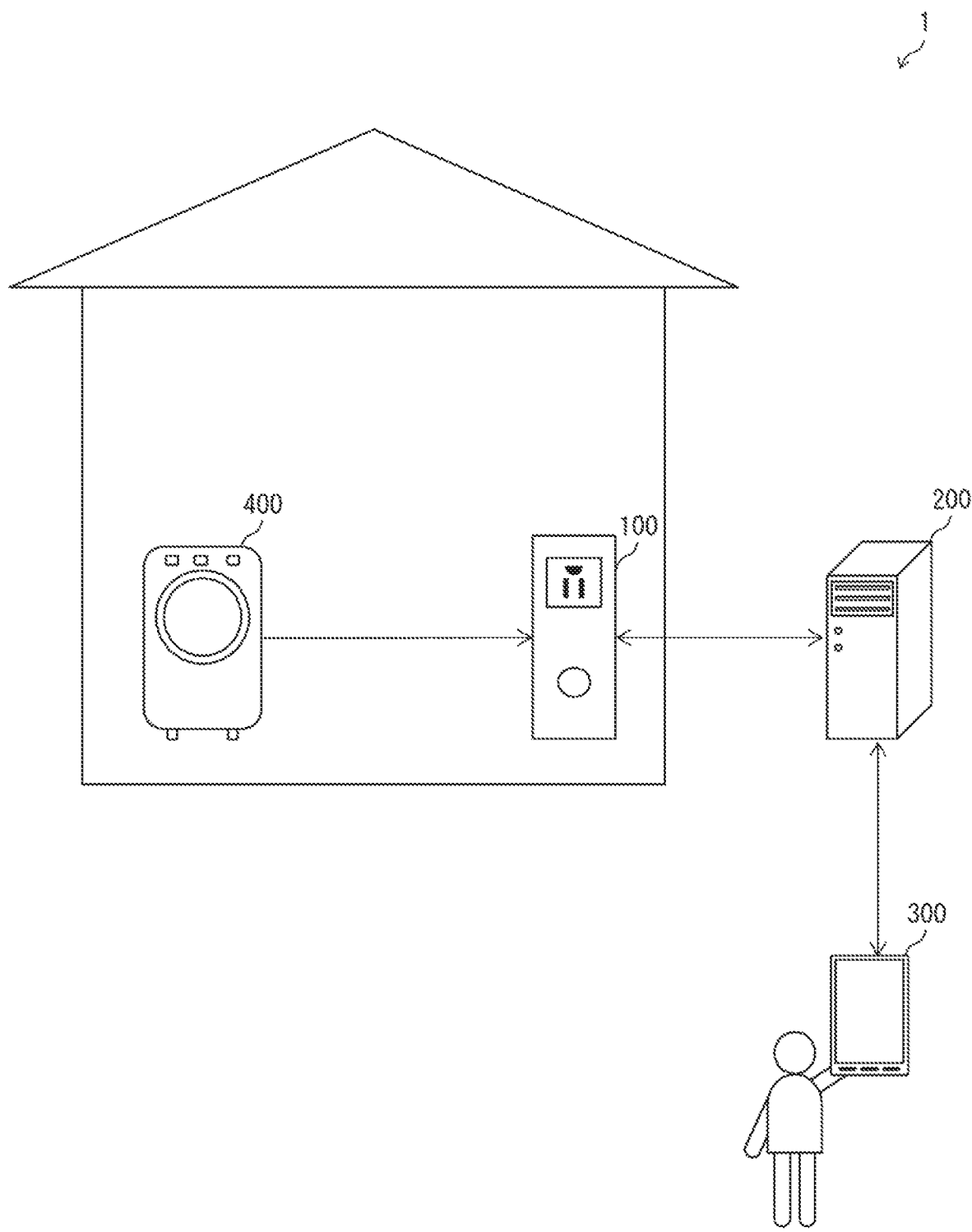
FIG. 1 schematically illustrates one example of a general configuration of a monitoring system in accordance with. Embodiment 1 of the present invention.

The following description will discuss one embodiment of the present invention in detail with reference to FIGS. 1 to (Configuration of Monitoring System)

Figure 2:
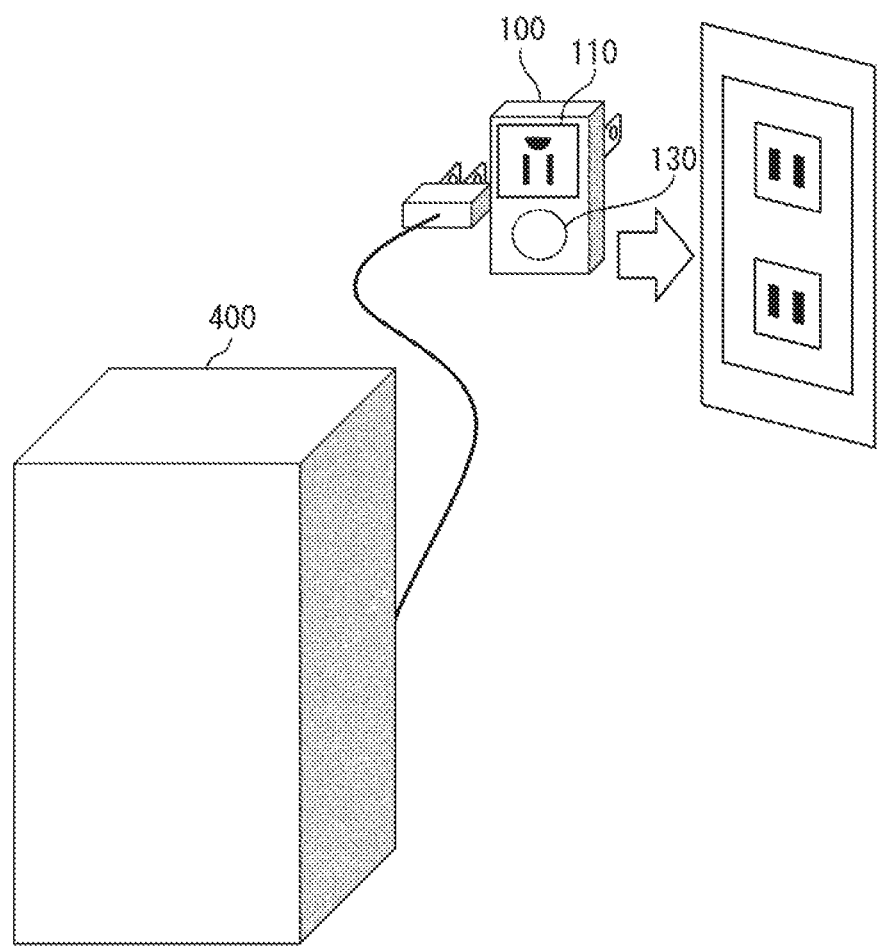
FIG. 2 schematically illustrates a monitoring apparatus in accordance with Embodiment 1 of the present invention.
Figure 3:
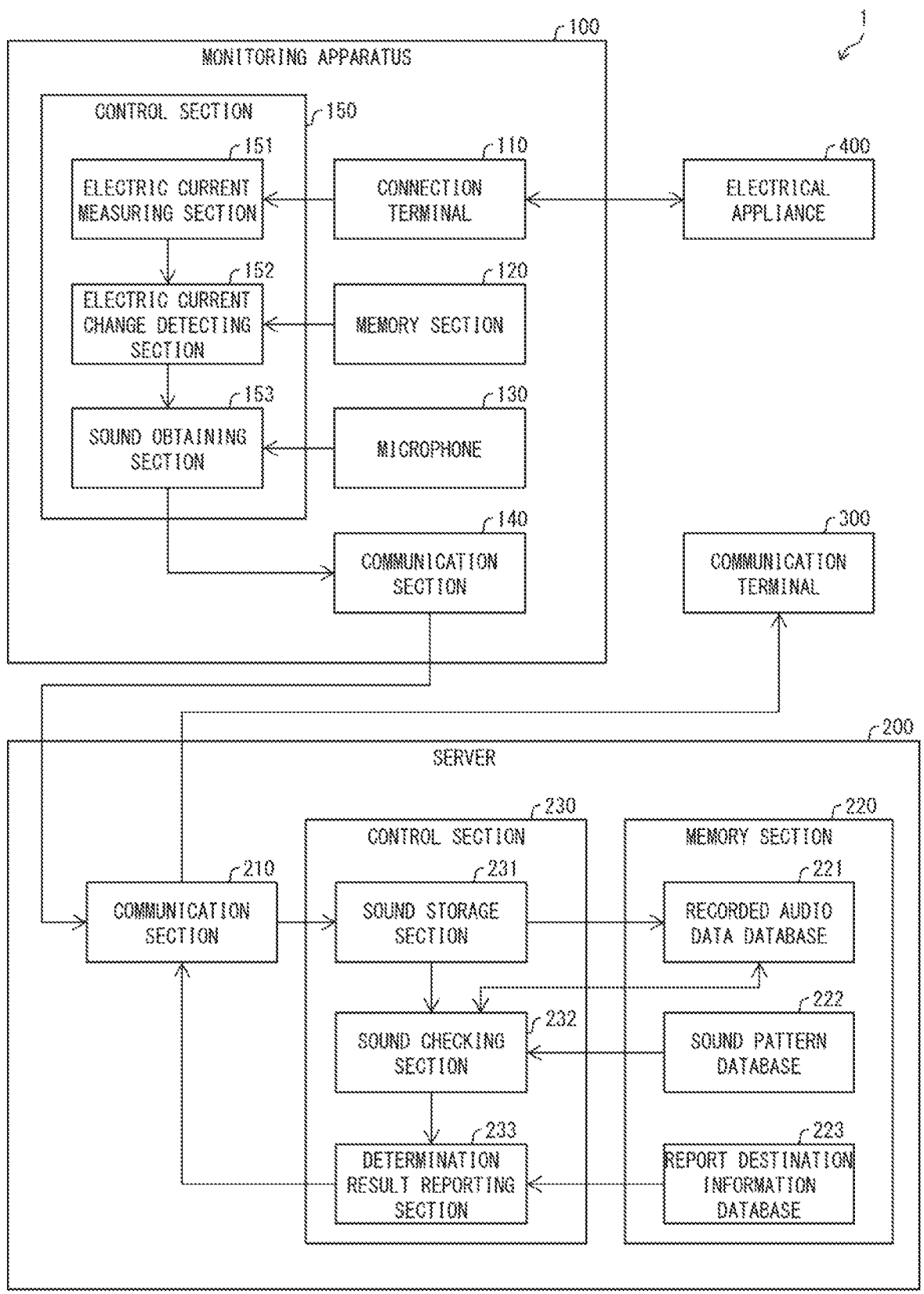
FIG. 3 is a block diagram illustrating one example of main components of a monitoring system in accordance with Embodiment 1 of the present invention.

The following description will discuss a configuration of a monitoring system 1 in accordance with Embodiment 1 with reference to FIGS. 1 to 3. FIG. 1 schematically illustrates one example of a general configuration of the monitoring system 1. FIG. 2 schematically illustrates a monitoring apparatus 100. FIG. 3 is a block diagram illustrating one example of main components of the monitoring system 1.

The monitoring system 1 is configured to monitor the to of an electrical appliance 400 which is to be monitored, and includes a monitoring apparatus 100, a server 200, and a communication terminal 300. In the monitoring system 1, if a predetermined change occurs in electric current consumed by the electrical appliance 400, the monitoring apparatus 100 obtains a notification sound that the electrical appliance 400 emits within a predetermined sound recording period which starts when the predetermined change is detected. Then, the monitoring system determines the state of the electrical appliance 400 from the notification sound thus obtained, and sends report information, which is indicative of the result of the determination, to the communication terminal 300.

Before use of the monitoring system 1, it is necessary that the monitoring apparatus 100, which is to monitor the electrical appliance 400, and the communication terminal 300, which is to receive a report indicative of the state of the electrical appliance 400, be associated with each other. To this end, for example, the communication terminal 300 is preferably configured to be capable of registering, with the server 200, pairing information between the communication terminal 300 and the monitoring apparatus 100. It is preferred here that pairing information between the electrical appliance 400 (which is to be monitored) and the monitoring apparatus 100 be also registered with the server 200.

(Configuration of Monitoring Apparatus)

The monitoring apparatus 100 is configured to detect the state of the electrical appliance 400 which is to be monitored. The monitoring apparatus 100 supplies electric current to the electrical appliance 400 and measures electric current consumed by the electrical appliance 400. The monitoring apparatus 100 includes a connection terminal 110, a memory section 120, a microphone 130, a communication section 140, and a control section 150. The control section 150 includes an electric current measuring section 151, an electric current change detecting section 152, and a sound obtaining section 153. As illustrated in FIG. 2, the monitoring apparatus 100 is, for example, a smart plug box that is connected between a socket and the electrical appliance 400 and that is configured to measure electric current consumed by the electrical appliance 400.

The connection terminal 110 is for connection to the electrical appliance 400. It is possible to supply, via the connection terminal 110, electric current to the electrical appliance 400 which is connected to the connection terminal 110. The magnitude of electric current supplied from the connection terminal 110 to the electrical appliance 400 is measured by the electric current measuring section 151.

The memory section 120 is configured to store therein various kinds of information about the monitoring apparatus 100. For example, the memory section 120 stores: information about the communication terminal 300 which is associated with the monitoring apparatus 100; configuration information for use by the electric current change detecting section 152 to detect a predetermined change in electric current consumed by the electrical appliance 400; and/or the like information. Note that the configuration information, which is to be used by the electric current change detecting section 152 to detect the predetermined change, may be updatable with information obtained from the sever 200.

The microphone 130 is configured to operate in response to an instruction from the sound obtaining section 153, and is configured to obtain a notification sound that the electrical appliance 400 emits within a predetermined sound recording period which starts when the electric current change detecting section 152 detects a predetermined change in electric current consumed by the electrical appliance 400. As illustrated in FIG. 2, the microphone 130 may be located near the connection terminal 110.

The communication section 140 is for external communication. In Embodiment 1, the communication section 140 functions as a transmitting section to transmit audio data, which contains a notification sound emitted by the electrical appliance 400, to the server 200.

The control section 150 is configured to control various sections in an integrated manner.

The electric current measuring section 151 measures electric current consumed by the electrical appliance 400 which is connected to the connection terminal 110, and transmits the result of the measurement to the electric current change detecting section 152

The electric current change detecting section 152 detects, on the basis of the result of the measurement of the electric current consumed by the electrical appliance 400 (the result received from the electric current measuring section 151), whether a predetermined change has occurred in electric current consumed by the electrical appliance 400. Specific examples of such a predetermined change will be described later. The electric current change detecting section 152, upon detecting that a predetermined change has occurred in electric current consumed by the electrical appliance 400, instructs the sound obtaining section 153 to start sound recording so that a notification sound emitted by the electrical appliance 400 will be obtained.

The sound obtaining section 153, upon receiving an instruction about the start of sound recording from the electric current change detecting section 152, carries out sound recording with the use of the microphone 130 for a predetermined sound recording period. The sound obtaining section 153 sends, to the server 200 via the communication section 140, audio data that has been obtained through the sound recording and that contains a notification sound emitted by the electrical appliance 400.

(Configuration of Server)

The server 200 receives, from the monitoring apparatus 100, the audio data that contains a notification sound emitted by the electrical appliance 400. The server 200 determines the state of the electrical appliance 400 from the notification sound emitted by the electrical appliance 400 and contained in the received audio data, and sends, to the communication terminal 300 associated with the monitoring apparatus 100, report information indicative of the result of the determination. If the server 200 has failed to determine the state of the electrical appliance 400, the server 200 may transmit the audio data itself to the communication terminal 300. The server 200 includes a communication section 210, a memory section 220, and a control section 230. The memory section 220 includes a recorded audio data database 221, a sound pattern database 222, and a report destination information database 223. The control section 230 includes a sound storage section 231, a sound checking section 232, and a determination result reporting section 233.

The communication section 210 serves to establish communication between the server 200 and the monitoring apparatus 100 and between the server 200 and the communication terminal 300. The communication section 210 receives, from the monitoring apparatus 100, audio data that contains a notification sound emitted by the electrical appliance 400, and transmits the audio data to the sound storage section 231. The communication section 210 also transmits, to the communication terminal 300 which is set as a report destination, report information which has been received from the determination result reporting section 233 and which is indicative of the result of the determination.

The memory section 220 is configured to store therein various kinds of information which are to be dealt with by the server 200.

The recorded audio data database 221 stores therein audio data which the server 200 has received from the monitoring apparatus 100 and which contains a notification sound emitted by the electrical appliance 400. To the recorded audio data database 221, new records are added by the sound storage section 231, and the records in the recorded audio data database 221 are referenced and updated by the sound checking section 232. A specific example of the recorded audio data database 221 will be described later.

The sound pattern database 222 stores, in regard to each of various electrical appliances including the electrical appliance 400, a combination of a sound pattern of a notification sound emitted by the electrical appliance and a state of the electrical appliance indicated by the notification sound. For example, the sound pattern database 222 stores therein a combination, for each model of electrical appliance, of a sound pattern of a notification sound and its corresponding state of the electrical appliance. Audio data that is registered with the recorded audio data database 221 and that contains a notification sound emitted by the electrical appliance 400 is checked against the data stored in the sound pattern database 222.

The report destination information database 223 stores therein information about the communication terminal 300 to which the result of determination is to be sent after the server 200 determines the state of the electrical appliance 400. In other words, the report destination information database 223 stores therein pairing information between the monitoring apparatus 100 and the communication terminal 300. For example, the report destination information database 223 may store: identification information for uniquely identifying the monitoring apparatus 100, from which audio data is sent; and an e-mail address of the communication terminal 300 associated with the monitoring apparatus 100.

The control section 230 controls various sections of the server 200 in an integrated manner.

The sound storage section 231 stores, into the recorded audio data database 221, audio data that contains a notification sound emitted by the electrical appliance 400 and that has been received from the monitoring apparatus 100 via the communication section 210. The sound storage section 231, after having stored the audio data, instructs the sound checking section 232 to determine the state of the electrical appliance 400 based on the audio data.

The sound checking section 232 determines the state of the electrical appliance 400 from the notification sound that was emitted by the electrical appliance 400 and that is contained in the audio data. Specifically, the sound checking section 232 obtains audio data from the recorded audio data database 221, and checks a notification sound, which is contained in the audio data and which was emitted by the electrical appliance 400, against sound patterns registered with the sound pattern database 222. If the notification sound matches any of the sound patterns, then it is determined that the state corresponding to the matched sound pattern is the state of the electrical appliance 400. On the other hand, if the notification sound does not match any of the sound patterns, the state of the electrical appliance 400 stays unknown. The checking of the notification sound against the sound patterns may be carried out in any manner. For example, the checking may be carried out in the following manner: a user extracts, from records in the sound pattern database 222, only records corresponding to the model of the electrical appliance 400 connected to the monitoring apparatus 100; and then the notification sound is checked only against the extracted records.

The determination result reporting section 233 sends, to the communication terminal 300 associated with the monitoring apparatus 100 from which the audio data is sent, report information indicative of the result of the determination that has been made by the sound checking section 232 on the state of the electrical appliance 400. For example, the determination result reporting section 233 obtains pairing information between the monitoring apparatus 100 and the communication terminal 300 from the report destination information database 223, and sends, to a report destination contained in the pairing information, the report information indicative of the result of the determination. The determination result reporting section 233 may transmit the audio data itself to the communication terminal 300 if the sound checking section 232 has failed to determine the state of the electrical appliance 400.

(Configuration of Communication Terminal 300)

The communication terminal 300 is capable of communicating with the monitoring apparatus 100 and the server 200, and is, for example, a smartphone. The communication terminal 300 can be associated with the monitoring apparatus 100, and pairing information indicative of such an association is registered with, for example, the report destination information database 223 of the server 200. The information that can be registered by the communication terminal 300 is not limited to pairing information. For example, via the communication terminal 300, information about the model of the electrical appliance 400 connected to the monitoring apparatus 100 may be registered with the memory section 220 in advance.

The communication terminal 300 is configured to provide a user with a report from the server 200 through a sound, vibration, display, and/or the like. Specifically, the communication terminal 300 includes output sections such as a speaker to output a sound, a vibrator to generate a vibration, and/or a display to carry out a display. The report from the server 200 may be carried out in any way, provided that the report information indicative of the result of the determination concerning the state of the electrical appliance 400 can be provided to the communication terminal 300. The report can be carried out, for example, via messaging (such as notification, SMS, e-mails).

The communication terminal 300 is capable of receiving audio data from the server 200 and reproducing a sound of the audio data. Note here that a user, after listening to the sound of the audio data, may give the server 200 a feedback of what is indicated by the audio data. For example, the following configuration may be employed: a user is enabled to configure what message should be presented via the communication terminal 300 if the same audio data is received again by the server 200 in the future. More specifically, the following configuration may be employed: a user is enabled to add a new record to the sound pattern database 222 of the server 200 on the basis of the sound of the audio data listened to by the user.

The electrical appliance 400 is a general electrical apparatus that consumes electric current, which is supplied from the monitoring apparatus 100, to operate. The electrical appliance 400 may be any kind of apparatus, but is preferably configured such that a great change will occur in electric current consumed by the electrical appliance 400 when its operational state transitions from operating state to standby state. The electrical appliance 400 is capable of emitting a notification sound corresponding to each kind of operation. For example, the electrical appliance 400 is preferably configured such that the electrical appliance 400 emits different kinds of notification sound between when an operation instructed by a user is complete and when an error has occurred for some reason.

(Change in Electric Current Consumed by Electrical Apparatus and Transition if Operational State if Electrical Appliance)

Figure 4:
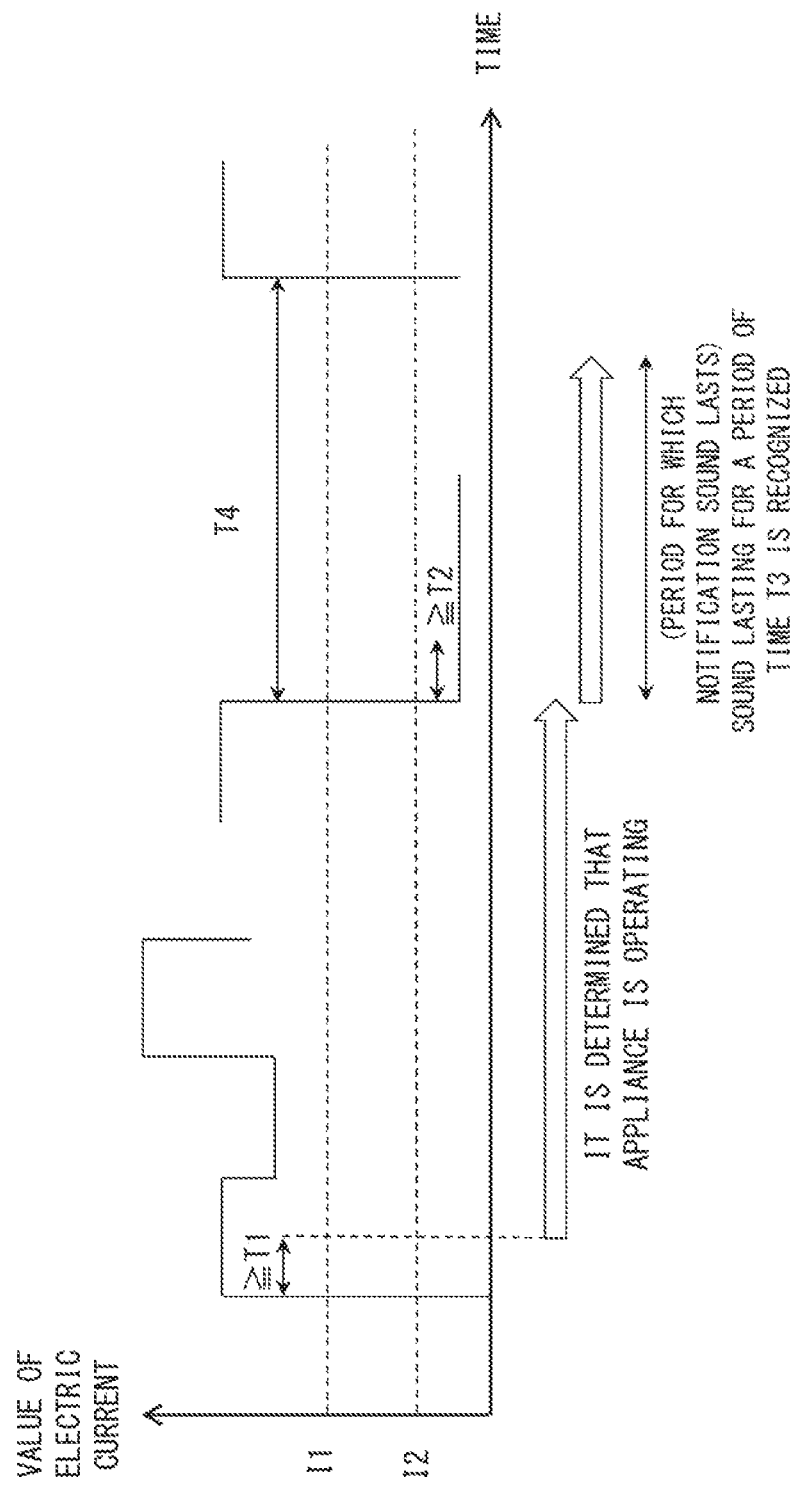
FIG. 4 is a graph showing one example exemplarily illustrating changes in electric current consumed by an electrical appliance and transitions of the operational state of the electrical appliance in accordance with Embodiment 1 of the present invention.

The following description will discusses, with reference to FIG. 4, a specific example of how the monitoring apparatus 100 detects transitions of the operational state of the electrical appliance 400, with respect to changes in electric current consumed by the electrical appliance 400. FIG. 4 is a graph exemplarily illustrating changes in electric current consumed by the electrical appliance 400 and transitions of the operational state of the electrical appliance 400.

In the example illustrated in FIG. 4, the horizontal axis in the graph indicates time, whereas the vertical axis indicates the value of electric current consumed by the electrical appliance 400 and measured by the electric current measuring section 151 of the monitoring apparatus 100. The "I1" in the graph is a first threshold for detecting that the operational state of the electrical appliance 400 is operating state, whereas I2" in the graph is a second threshold for detecting that the operational state of the electrical appliance 400 is standby state. The value of I2 is less than the value of I1. In other words, the electrical appliance 400 consumes an electric current equal to or greater than I1 when its operational state is operating state, whereas consumes an electric current equal to or less than I2 when its operational state is standby state.

Time T1 is a first period, which is long-enough time to wait to highly accurately detect that, on the basis of the magnitude of consumed electric current, the operational state of the electrical appliance 400 has transitioned into operating state. Time T2 is a second period, which is long-enough time to wait to highly accurately detect that, on the basis of the magnitude of consumed electric current, the operational state of the electrical appliance 400 has transitioned into standby state. Time T3 is a predetermined sound recording period that starts after the operational state of the electrical appliance 400 has transitioned from operating state into standby state and that is long enough to include a notification sound. Time T4 is a third period, which is long-enough time to wait to highly accurately detect that, on the basis of the magnitude of consumed electric current, the operational state of the electrical appliance 400 has transitioned from standby state into operating state again.

The electric current measuring section 151 of the monitoring apparatus 100 continuously measures electric current consumed by the electrical appliance 400. Meanwhile, the electric current change detecting section 152 detects that the value of the electric current has been equal to or greater than I1. for a period of time T1 or longer. From this detection, it is inferred that the operational state of the electrical appliance 400 is operating state.

After detecting a consumed electric current of equal to or greater than I1 (first threshold), the electric current change detecting section 152 next detects a consumed electric current of equal to or less than I2 (second threshold). From this detection, it is inferred that the operational state of the electrical appliance 400 has transitioned from operating state into standby state. Meanwhile, the electric current change detecting section 152, which has detected a predetermined change in electric current consumed by the electrical appliance 400, instructs the sound obtaining section 153 to start sound recording with the use of the microphone 130.

Note, however, that the value of the consumed electric current may have become equal to or less than I2 only temporarily and that the operational state of the electrical appliance 400 may still be operating state. To address this issue, the following configuration may be employed: the electric current change detecting section 152 determines that a predetermined change has occurred if, after detecting that the consumed electric current is equal to or greater than I1 (first threshold), the electric current change detecting section 152 has detected that the consumed. electric current has been equal to or less than I2 (second threshold) for a period of time T2 (a predetermined duration) or longer.

In the monitoring apparatus 100, after a predetermined change in the consumed electric current is detected because of a transition of the operational state of the electrical appliance 400 from operating state to standby state, the sound obtaining section 153 carries out recording of sounds collected by the microphone 130 for a period of time T3. Time T3 here is a period that is long enough to record a notification sound emitted by the electrical appliance 400. After that, audio data of the recorded sound is transmitted to the server 200.

Next, the monitoring apparatus 100 detects that the value of electric current consumed by the electrical appliance 400 has become equal to or greater than I1 after a period of time T4. From this detection, it is inferred that the operational state of the electrical appliance 400 has transitioned into operating state again. Needless to say, if the consumed electric current is still equal to or less than I2 even after a period of time T4, it is inferred that the operational state of the electrical appliance 400 is still standby state.

In this way, it is possible to infer the operational state of the electrical appliance 400 from temporal changes in consumed electric current. It should be noted that the predetermined change in consumed electric current detected by the electric current change detecting section 152 may be any kind of change, provided that the change occurs at a point in time at which the operational state of the electrical appliance 400 changes and the electrical appliance 400 emits a notification sound.

The notification sound does not need to be a sound that is emitted by the electrical appliance 400 when the electrical appliance 400 is operating normally. For example, the following configuration may be employed: a third threshold I3, which is greater than I1 and which is not exceeded as long as the electrical appliance 400 is operating normally, is set; and, if the electric current change detecting section 152 has detected a consumed electric current of equal to or greater than I3, the electric current change detecting section 152 determines that a predetermined change has occurred and instructs the sound obtaining section 153 to start sound recording. For example, if the consumed electric current has exceeded I3 due to an abnormal load imposed on the electrical appliance 400, it is likely that the electrical appliance 400 is making an unusual sound. Thus, according to this configuration, it is possible to record the unusual sound when the consumed electric current has exceeded I3.

(Determination of State of Electrical Appliance Using Audio Data)

The following description will discuss, with reference to FIG. 5, how the server 200 of Embodiment 1 carries out determination of the state of the electrical appliance 400 using the audio data received from the monitoring apparatus 100. FIG. 5 is a table showing one example of a determination of state carried out by the server 200.

In the example shown in FIG. 5, information items within the area enclosed by dashed line are specific examples of data registered with the recorded audio data database 221. For example, information items in the column named "ID OF MONITORING APPARATUS" are each an identifier for uniquely identifying a monitoring apparatus 100 from which audio data is sent, and information items in the column named "TYPE OF APPLIANCE" are model names or the like each of which indicates a type of an electrical appliance 400 connected to the monitoring apparatus 100. Information items in the column named "DATE AND TIME OF RECORDING" each indicate date and time at which the audio data was recorded, and information items in the column named "RECORDED AUDIO DATA" are each a file name of audio data received by the server 200.

In FIG. 5, there is another column on the right side of the area enclosed by dashed line. In this column which is named "ID OF MATCHED SOUND PATTERN", the result of state determination for each record is provided. Information items in this column are each an identifier uniquely identifying a sound pattern registered with the sound pattern database 222. For example, the information item "A (SOUND INDICATING END OF APPLIANCE'S OPERATION)" in the column named "ID OF MATCHED SOUND PATTERN" has the sound pattern identifier "A", which means that the sound pattern associated therewith is of a notification sound that is emitted when the operation of the electrical appliance is completed normally.

For example, for the record whose "ID OF MONITORING APPARATUS" is "S001" and whose "TYPE OF APPLIANCE" is "XX-YY01", the audio data "SOUND 1" shown in the "RECORDED AUDIO DATA" column is registered. The record shows that the "SOUND 1" contains a sound pattern that matches "A (SOUND INDICATING END OF APPLIANCE'S OPERATION)" registered with the sound pattern database 222. That is, the record whose "ID OF MONITORING APPARATUS" is "S001" and whose "TYPE OF APPLIANCE" is "XX-YY01" shows that the notification sound in the audio data matches the sound pattern indicating that the operation of the electrical appliance 400 has been completed normally. Note that, in the example shown in FIG. 5, if the notification sound does not match any of the sound patterns, then "NO MATCHED SOUND PATTERN" is shown.

In this way, the server 200 registers audio data received from the monitoring apparatus 100 with the recorded audio data database 221, and checks the audio data against the sound patterns in the sound pattern database 222. On the basis of the result of this checking, it is possible to determine the state of the electrical appliance 400.

Note that it is preferable that information about the model name or the like indicative f the type of the electrical appliance 400 connected to the monitoring apparatus 100 is registered together with the identifier of the monitoring apparatus 100. For example, information about a model name or the like may be registered together with pairing information between the monitoring apparatus 100 and the communication terminal 300 when the pairing information is registered with the report destination information database 223 of the server 200. If the model of the electrical appliance 400 associated with the monitoring apparatus 100 is already known to the server 200, the server 200 is capable of carrying out the foregoing determination of state by referencing only data concerning that model, without having to reference all data in the sound pattern database 222. This makes it possible to improve accuracy of determination.

(Process Flow)

(Flow of Processes Carried Out by Monitoring Apparatus)

Figure 6:
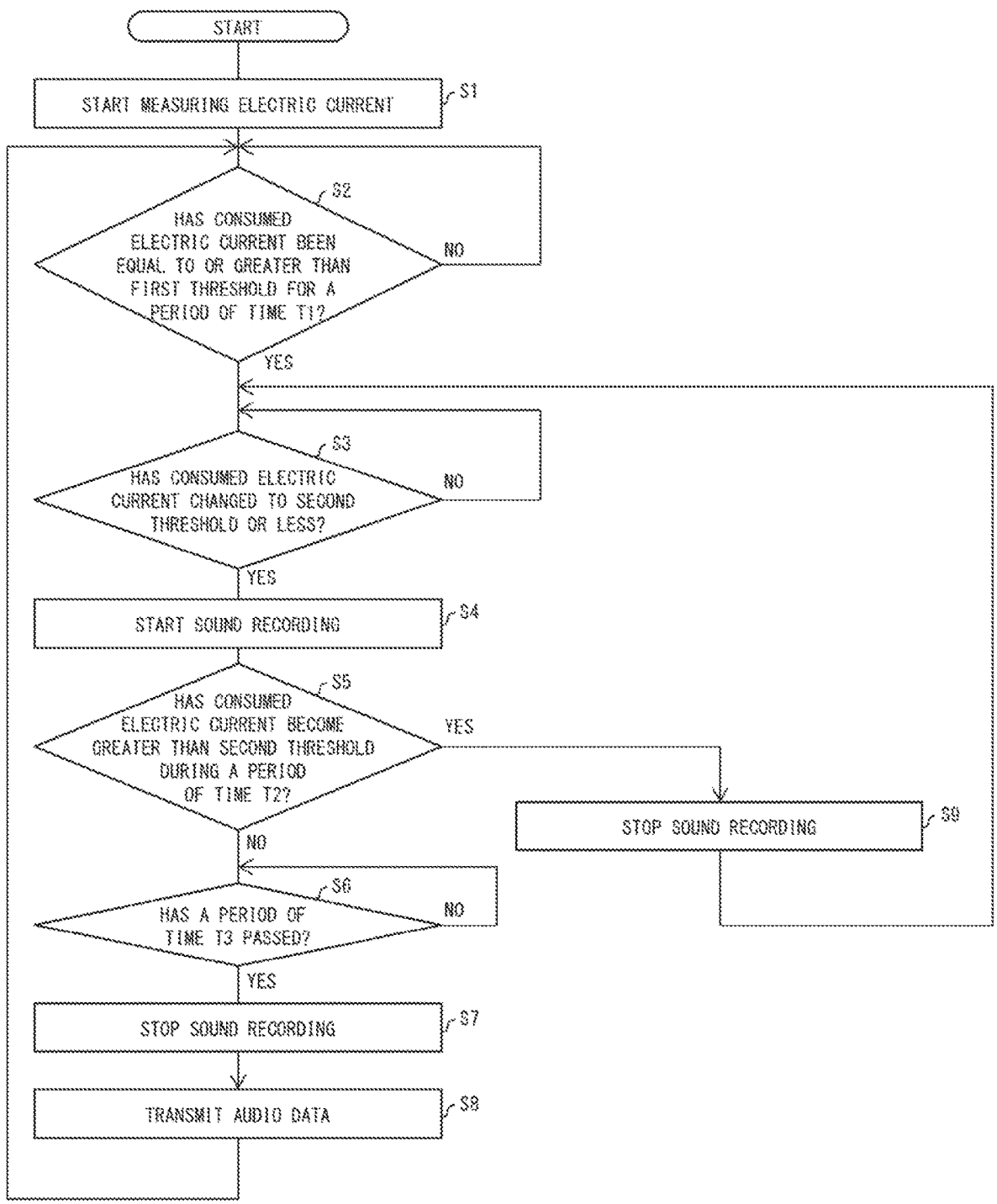
FIG. 6 is a flowchart illustrating one example of a flow of processes carried out by a monitoring apparatus in accordance with Embodiment 1 of the present invention.

The following description will discuss, with reference to FIG. 6, a flow of processes carried out by the monitoring apparatus 100 of Embodiment 1. FIG. 6 is a flowchart illustrating one example of the flow of processes carried out by the monitoring apparatus 100. It is assumed here that pairing information between the monitoring apparatus 100 and the communication terminal 300 has already been registered with the report destination information database 223 of the server 200 before the start of a series of processes.

First, the electric current measuring section 151 starts measuring electric current consumed by the electrical appliance 400 connected to the connection terminal 110 (S1: electric current measuring step). Next, the electric current change detecting section 152 determines whether or not the electric current consumed by the electrical appliance 400 has been equal to or greater than the first threshold for a period of time T1 (S2). If it is determined that the consumed electric current has been equal to or greater than the first threshold for a period of time T1 (YES in S2), then the electric current change detecting section 152 determines whether or not the consumed electric current has changed to the second threshold or less (S3: electric current change detecting step). If it is determined that the consumed electric current has changed to the second threshold or less (YES in S3), then the sound obtaining section 153 starts sound recording using the microphone 130 in order to obtain a notification sound emitted by the electrical appliance 400 (S4: notification sound obtaining step).

After S4, the electric current change detecting section 152 determines whether or not the electric current consumed by the electrical appliance 400 has become greater than the second threshold within a period of time T2 (S5). If it is determined that the consumed electric current has not become greater than the second threshold (NC) in S5), then the electric current change detecting section 152 further determines whether or not a period of time T3 has passed since the start of the sound recording (S6). If it is determined that a period of time T3 has passed (YES in S6), then the sound obtaining section 153 stops the sound recording (S7) and transmits audio data to the server 200 via the communication section 140 (S8: transmitting step).

On the other hand, if it is determined in S5 that the electric current consumed by the electrical appliance 400 has become greater than the second threshold within a period of time T2 (YES in S5), then the sound obtaining section 153 stops the sound recording (S9). Then, the process proceeds to S3.

Through the above-described processes, the monitoring apparatus 100 is capable of, if a predetermined change occurs in electric current consumed by the electrical appliance 400, obtaining audio data that contains a notification sound (e.g., sound indicating end of operation, and/or sound indicating error) that the electrical appliance 400 emits within a predetermined sound recording period which starts when the change is detected. This brings about an effect of making it possible to obtain, on an as-needed basis, audio data containing a notification sound emitted by an electrical appliance.

The monitoring apparatus 100, and the monitoring system 1 including the monitoring apparatus 100, are each configured such that the sound recording is carried out only during a predetermined sound recording period if a predetermined change occurs and that the audio data is transmitted to the server 200. With this configuration, only audio data necessary for monitoring is transmitted. Therefore, for example, it is possible to reduce the likelihood that audio data transmitted from the monitoring apparatus 100 to the server 200 will be secretly listened to by someone and this will result in leakage of a user's privacy or the like.

(Flow of Processes Carried Out by Server)

Figure 7:
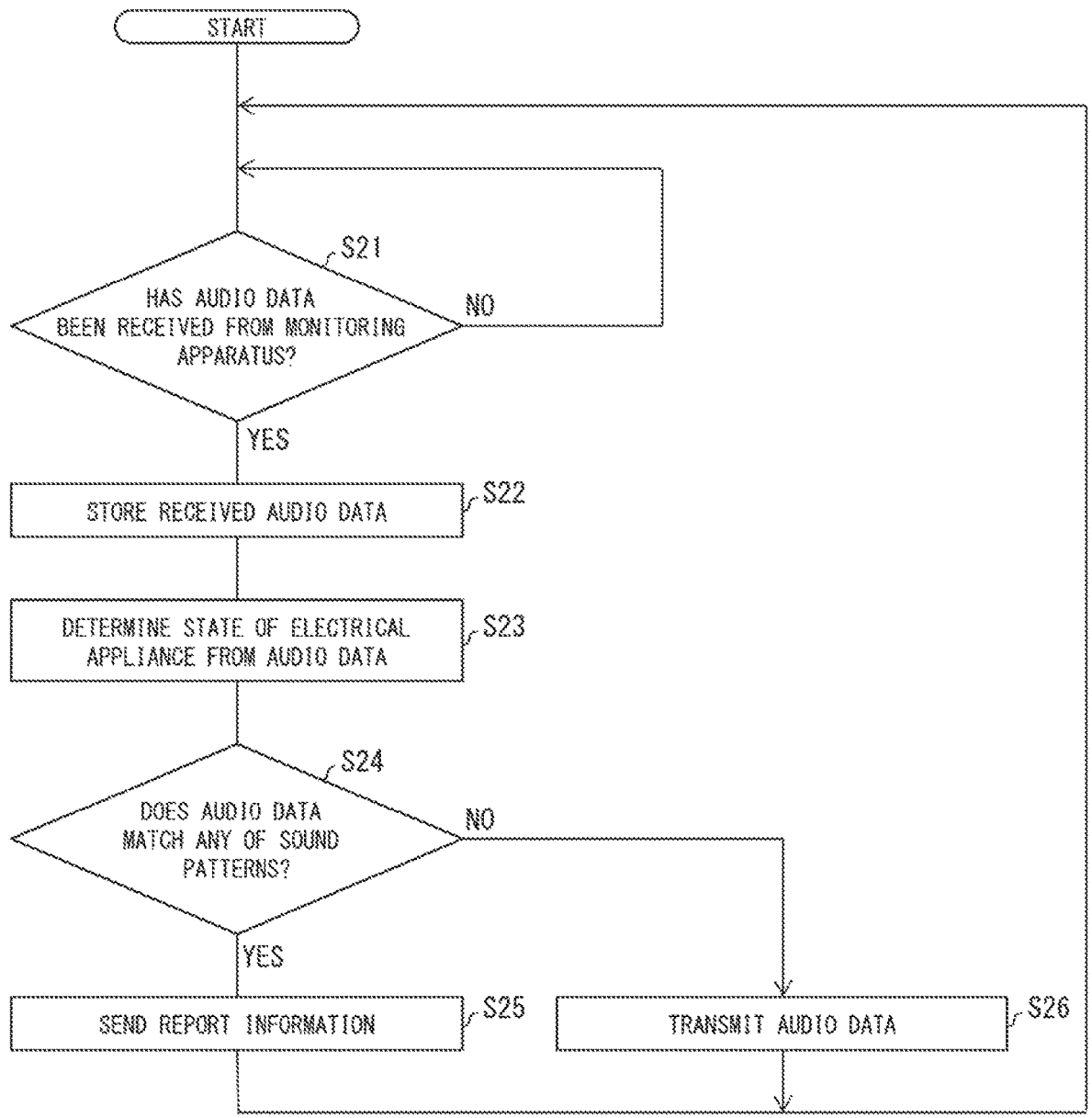
FIG. 7 is a flowchart illustrating one example of a flow of processes carried out by a server in accordance with Embodiment 1 of the present invention.

The following description will discuss, with reference to FIG. 7, a flow of processes carried out by the server 200 of Embodiment 1. FIG. 7 is a flowchart illustrating one example of a flow of processes carried out by the server 200. It is assumed here that pairing information between the monitoring apparatus 100 and the communication terminal 300 has already been registered with the report destination information database 223 of the server 200 before the start of a series of processes.

First, the control section 230 determines whether or not audio data has been received from the monitoring apparatus 100 (S21). If it is determined that audio data has been received (YES in S21), then the sound storage section 231 stores the received audio data into the recorded audio data database 221 (S22).

Next, the sound checking section 232 checks the audio data stored in the recorded audio data database 221 against sound patterns in the sound pattern database 222 to thereby determine the state of the electrical appliance 400 from the audio data (S23). Specifically, the sound checking section 232 determines whether or not the audio data matches any of the sound patterns registered with the sound pattern database 222 (S24). If it is determined that the audio data matches any of the sound patterns (YES in S24), then the determination result reporting section 233 uses the pairing information registered with the report destination information database 223 to send, to a report destination (communication terminal 300), report information indicative of the result of the determination (S25). On the other hand, if it is determined that the audio data does riot match any of the sound patterns (NO in S24), then the determination result reporting section 233 uses the pairing information to transmit, to a report destination (communication terminal 300), the audio data itself which was used in the determination of the state of the electrical appliance 400 in S23 (S26).

Through the above-described processes, the server 200 of Embodiment 1 is capable of determining the state of the electrical appliance 400 from the audio data that has been received from the monitoring apparatus 100 and that contains a notification sound emitted by the electrical appliance 400. With this configuration, the determination by the server 200 can be carried out by checking only sounds that are assumed to be outputted when the electrical appliance 400 transitions from operating state to standby state. This brings about an effect of making it possible to provide a very convenient server in which only a reduced number of kinds of sound needs to be checked to determine the state of an electrical appliance and which thereby has an improved processing efficiency.

The server 200 is configured to send, to the communication terminal 300, report information indicative of the result of the determination if the server 200 has succeeded in determining the state of the electrical appliance 400 and (ii) transmit audio data to the communication terminal 300 if the server 200 has failed to determine the state of the electrical appliance 400. This allows a user to know the state of the electrical appliance either from the report information indicative of the result of the determination or from the audio data.

The following configuration may alternatively be employed: when the report information indicative of the result of determination is sent in S25, the audio data is also transmitted similarly to S26. Since a user can listen to the sound of the audio data, the user himself can check what is indicated by the result of determination of the state of the electrical appliance 400 made by the monitoring system 1.

Embodiment 2

Figure 8:
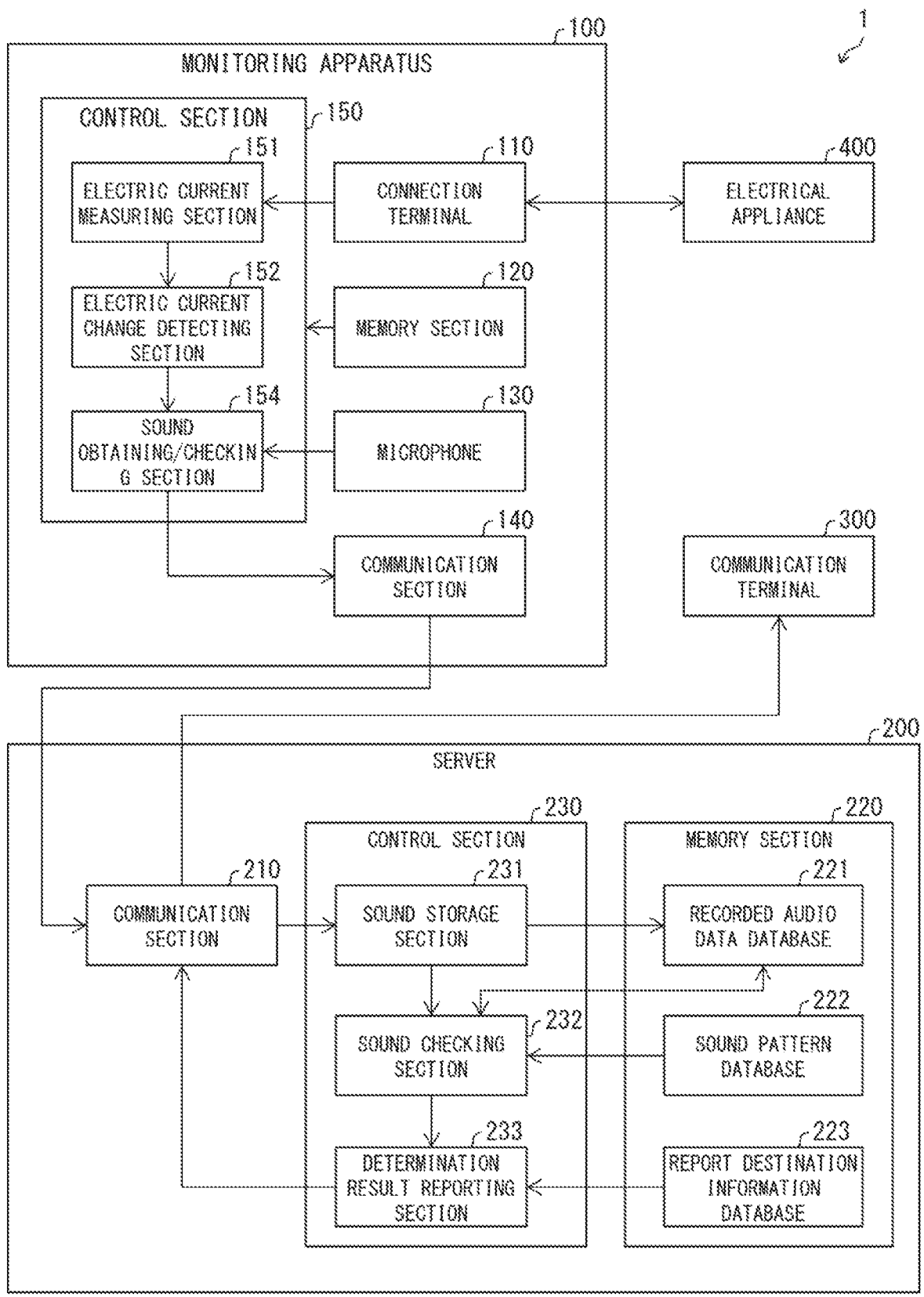
FIG. 8 is a block diagram illustrating one example of main components of a monitoring system in accordance with Embodiment 2 of the present invention.

The following description will discuss another embodiment of the present invention with reference to FIG. 8. For convenience of description, members having functions identical to those of Embodiment 1 are assigned identical referential numerals and their descriptions are omitted.

(Configuration of Monitoring System)

The following description will discuss, with reference to FIG. 8, a configuration of a monitoring system of Embodiment 2. FIG. 8 is a block diagram illustrating one example of main components of the monitoring system 1. The monitoring system 1 of Embodiment 2 is basically the same as Embodiment 1, but is different in some configuration. A monitoring apparatus 100 in Embodiment 2 includes a sound obtaining/checking section 154 serving as an apparatus's sound checking section, in place of the sound obtaining section 153.

The sound obtaining/checking section 154 has the function of the sound obtaining section 153 described in Embodiment 1, and further has a function equivalent to that of the sound checking section 232 of the server 200. That is, the sound obtaining/checking section 154 has the following four functions. The first function is to obtain audio data containing a notification sound emitted by the electrical appliance 400 in response to an instruction from the electric current change detecting section 152. The second function is to check the audio data against sound patterns and to thereby determine the state of the electrical appliance from the notification sound that is contained in the audio data and that was emitted by the electrical appliance 400. The third function is to send report information indicative of the result of the determination to the server 200. The sound obtaining/checking section 154 further has, as the fourth function, the function of transmitting the audio data to the server 200 if the sound obtaining/checking section 154 could not find any sound pattern that matches the notification sound contained in the audio data.

The monitoring apparatus 100 stores, in the memory section 120, at least some of the sound patterns registered with the sound pattern database 222 of the server 200. The sound obtaining/checking section 154 checks the obtained audio data against the sound patterns in the memory section 120. The monitoring apparatus 100 may obtain the sound patterns, which are for use in checking, from the server 200.

On the other hand, when the server 200 has received, from the monitoring apparatus 100, report information indicative of the result of determination of the state of the electrical appliance 400, the server 200 sends the report information to the communication terminal 300. In a case where the server 200 has received audio data from the monitoring apparatus 100, the sound checking section 232 may or may not check the audio data against sound patterns in the sound pattern database 222. For example, the following configuration may be employed: the sound checking section 232 checks the audio data against sound patterns that have not been checked by the monitoring apparatus 100.

The monitoring apparatus 100 of Embodiment 2 can be configured such that the monitoring apparatus 100 transmits, to the server 200, only audio data that does not match any of the sound patterns contained in the monitoring apparatus 100. This can reduce the amount of data transmission.

The following configuration may alternatively be employed: if the sound obtaining/checking section 154 has determined the state of the electrical appliance 400, a report indicative of the result of the determination is sent to the communication terminal 300, which has been set in advance as a report destination, instead of the server 200. In other words, the communication section 140 of the monitoring apparatus 100 may serve as a transmitting section to transmit the result of the determination made by the sound obtaining/checking section 154 to the server 200 and to an external apparatus such as the communication terminal 300.

Embodiment 3

Embodiments 1 and 2 exemplarily discussed configurations in which one server 200 is used; however, the functions of the server 200 may be realized by respective different servers. In a case where a plurality of servers are used, the servers may be under management of the same business operator or of different business operators.

Embodiment 4

Blocks of the monitoring apparatus 100 and the server 200 may be realized by a logic circuit (hardware) provided in an integrated circuit (IC chip) or the like or may be realized by software. In the latter case, the monitoring apparatus 100 and the server 200 can each be constituted by a computer as illustrated in FIG. 9.

FIG. 9 is a block diagram exemplarily illustrating a configuration of a computer 910 that can be used as the monitoring apparatus 100 or the server 200. The computer 910 includes an arithmetic unit 912, a main storage 913, an auxiliary storage 914, an input-output interface 915, and a communication interface 916, which are connected together via a bus 911. The arithmetic unit 912, the main storage 913, and the auxiliary storage 914 may each be, for example, a processor (e.g., central processing unit, CPU), RAM (random access memory), or a hard disk drive. The input-output interface 915 is connected with an input device 920 via which a user inputs various kinds of information into the computer 910 and an output device 930 via which the computer 910 presents various kinds of information to the user. The input device 920 and the output device 930 may be contained within the computer 910 or may be connected (externally connected) to the computer 910. The input device 920 may be, for example, a keyboard, a mouse, a touch sensor, or the like, whereas the output device 930 may be a display, a printer, a speaker, or the like. Alternatively, a device having both of the functions of the input device 920 and the output device 930, like a touch panel that serves both as a touch sensor and as a display, may be employed. The communication interface 916 is an interface for communication between the computer 910 and external devices.

The auxiliary storage 914 stores therein various programs for causing the computer 910 to function as the monitoring apparatus 100 or the server 200. The arithmetic unit 912 develops the programs stored in the auxiliary storage 914 in the main storage 913 and executes instructions contained in the programs, and thereby causes the computer 910 to function as each section of the monitoring apparatus 100 or the server 200. Note that a storage medium which is included in the auxiliary storage 914 and which stores information such as programs may be any medium, provided that it is a computer-readable "non-transitory tangible medium", and may be, for example, a tape, a disk, a card, a semiconductor memory, a programmable logic circuit, or the like. In a case where the computer 910 is a computer that is capable of executing the programs stored in the storage medium without developing the programs in the main storage 913, the main storage 913 may be omitted. The number of devices of each kind (arithmetic unit 912, main storage 913, auxiliary storage 914, input-output interface 915, communication interface 916, input device 920, and output device 930) may be one or two or more.

The computer 910 may externally obtain each of the foregoing programs. In this case, the program may be obtained via any transmission medium (such as a communication network or a broadcast wave). The present invention can also be implemented by the program in the form of a computer data signal embedded in a carrier wave which is embodied by electronic transmission.

[Variations]

Embodiments 1 to 4 discussed configurations in which the monitoring apparatus 100 measures electric current consumed by the electrical appliance 400 but does not carry out control of the electric current. Note, however, that the monitoring apparatus 100 may be configured such that, for example, the monitoring apparatus 100 reduces electric current supplied to the electrical appliance 400 if the electric current supplied to the electrical appliance 400 is abnormally high and there is the risk that fire may occur on the electrical appliance 400. This configuration may be arranged such that the monitoring apparatus 100 records a notification sound, which includes an unusual sound emitted by the electrical appliance 400, and transmits the recorded audio data to the server 200. The server 200 may be configured such that, if the received audio data contains a sound related to an error, such as an unusual sound, the server 200 sends, to the communication terminal 300, not only the result of determination of the state of the electrical appliance 400 but also additional information such as a solution to the error.

Embodiments 1 to 4 discussed configurations in which the server 200 determines the state of the electrical appliance 400 and sends report information indicative of the result of the determination to the communication terminal 300. Note, however, that the server 200 may be configured such that, for example, if the sever 200 has determined that the electrical appliance 400 is in error state, the server 200 provides additional information such as a solution to the error to the communication terminal 300. This configuration may be arranged such that, if the error necessitates some repair, the server 200 not only sends the report information to the communication terminal 300 but also transmits a repair request to a repair center or the like.

Embodiments 1 to 4 discussed configurations in which the server 200 sends report information indicative of a result of determination of the state of the electrical appliance 400 to the communication terminal 300 associated with the monitoring apparatus 100 via messaging such as using an e-mail. Note, however, that the following configuration may alternatively be employed for example, provided that the result of determination of the state of the electrical appliance 400 can be seen on the communication terminal 300: the communication terminal 300 logs in to the server 200 using a browser; and a user sees the result of determination of the state of the electrical appliance 400 presented via the browser.

Embodiments 1 to 4 discussed configurations in which the monitoring apparatus 100 carries out sound recording when a predetermined change is detected and transmits the audio data to the server 200. Note, however, that the monitoring apparatus 100 may be configured such that, for example, the monitoring apparatus 100 transmits, to the communication terminal 300 via the server 200, information about, for example, changes in electric current consumed by the electrical appliance 400, depending on need. This makes it possible for a user to know, from for example the changes in the consumed electric current, the time that has passed since the operational state of the electrical appliance 400 transitioned into operating state. As such, the user can predict when the electrical appliance 400 will stop operating and transition into standby state.

Embodiments 1 to 4 may be arranged such that, for example, a user of the communication terminal 300 can add data to the sound pattern database 222 of the server 200. Specifically, the following configuration may be employed; if audio data does not match any of sound patterns registered with the sound pattern database 222, a user directly checks the audio data and feeds back the result of the checking to the sound pattern database 222. The user here feeds back, for example, information indicative of a combination of a notification sound contained in the audio data and a corresponding state of the electrical appliance 400. In other words, the following configuration may be employed: a user adds, to the sound pattern database 222, a state of the electrical appliance 400 in association with the sound pattern of the notification sound contained in the audio data that the user checked. The data added to the sound pattern database 222 by the user's feedback may apply only to the user who added that data or may apply to all users who use the monitoring system 1. The server 200 may be configured such that, after receiving the information indicative of the combination, if the server 200 receives other audio data that contains a notification sound defined by that information, the sound checking section 232 will use that information to determine the state of the electrical appliance from the notification sound.

[Recap]

A monitoring system (1) in accordance with Aspect 1 of the present invention is a monitoring system for monitoring a state of an electrical appliance (400) which is to be monitored, the monitoring system including: a monitoring apparatus (100) configured to (i) measure electric current consumed by the electrical appliance and (ii) obtain a notification sound that the electrical appliance emits within a predetermined sound recording period which starts when a predetermined change in the electric current is detected, the monitoring system being configured to carry out a determination of the state of the electrical appliance from the notification sound obtained by the monitoring apparatus and send report information, which is indicative of a result of the determination, to a communication terminal (300) associated with the monitoring apparatus.

According to the above configuration, the monitoring system is capable of, if the monitoring apparatus has detected a predetermined change in electric current consumed by the electrical appliance, carrying out sound recording for a predetermined sound recording period and obtaining audio data that contains a notification sound emitted by the electrical appliance. The monitoring system is further capable of determining the state of the electrical appliance from the notification sound that is contained in the audio data obtained by the monitoring apparatus, and sending report information, which is indicative of the result of the determination, to the communication terminal. As such, the monitoring system is capable of obtaining audio data containing a notification sound emitted by an electrical appliance on an as-needed basis, and reporting, to a communication terminal, the state of the electrical appliance determined from the obtained audio data. This brings about an effect of making it possible to obtain audio data containing a notification sound emitted by an electrical appliance on an as-needed basis and determine the state of the electrical appliance by checking only the obtained audio data.

A monitoring apparatus (100) in accordance with Aspect 2 of the present invention is a monitoring apparatus for detecting a state of an electrical appliance (400) which is to be monitored, the monitoring apparatus including: an electric current measuring section (151) configured to measure electric current consumed by the electrical appliance; an electric current change detecting section (152) configured to detect a predetermined change in the electric current; a microphone (130) configured to obtain a notification sound that the electrical appliance emits within a predetermined sound recording period which starts when the predetermined change is detected; and a transmitting section (communication section 140) configured to transmit audio data containing the notification sound to a server (200).

According to the above configuration, the monitoring apparatus is configured to, if a predetermined change occurs in electric current consumed by the electrical appliance, obtain audio data that contains a notification sound (e.g., sound indicating end of operation, and/or sound indicating error) that the electrical appliance emits within a predetermined sound recording period which starts when the change is detected. This brings about an effect of making it possible to obtain audio data that contains a notification sound emitted by the electrical appliance on an as-needed basis.

A monitoring apparatus (100) in accordance with Aspect 3 of the present invention may be configured such that, based on Aspect 2, the electric current change detecting section (152) is configured to determine that the predetermined change has occurred if, after the electric current change detecting section (152) has detected that the electric current is equal to or greater than a first threshold, the electric current change detecting section (152) has detected that the electric current is equal to or less than a second threshold which is less than the first threshold.

According to the above configuration, the monitoring apparatus is capable of, if the electric current consumed by the electrical appliance has changed from a value equal to or greater than the first threshold to a value equal to or less than the second threshold and the operational state of the electrical appliance is inferred to have transitioned from operating state to standby state, obtaining audio data for a predetermined period from when the change occurred and transmitting the audio data to a server.

A monitoring apparatus (100) in accordance with Aspect 4 of the present invention may be configured such that, based on Aspect 2, the electric current change detecting section (152) is configured to determine that the predetermined change has occurred if, after the electric current change detecting section (152) has detected that the electric current is equal to or greater than a first threshold, the electric current change detecting section (152) has detected that the electric current has been equal to or less than a second threshold for a predetermined duration, the second threshold being less than the first threshold.

According to the above configuration, the monitoring apparatus is capable of, if the electric current consumed by the electrical appliance has changed from a value equal to or greater than the first threshold to a value equal to or less than the second threshold and then it is detected that the electric current has been equal to or less than the second threshold for a predetermined duration, obtaining audio data over a predetermined sound recording period from when the change occurred and transmitting the audio data to a server. This makes it possible to avoid obtaining audio data in a case where the electric current consumed by the electrical appliance changes from a value equal to or greater than the first threshold to a value equal to or less than the second threshold for only a moment.

A monitoring apparatus (100) in accordance with Aspect 5 of the present invention may be configured such that, based on any one of Aspects 2 to 4, the electric current change detecting section (152) is configured to use configuration information to detect the predetermined change, the configuration information being updatable with information obtained from the sever (200).

According to the above configuration, it is possible to detect the predetermined change by using configuration information that corresponds to the type of the electrical appliance.

A monitoring apparatus (100) in accordance with Aspect 6 of the present invention is a monitoring apparatus for detecting a state of an electrical appliance (400) which is to be monitored, the monitoring apparatus including: an electric current measuring section (151) configured to measure electric current consumed by the electrical appliance; an electric current change detecting section (152) configured to detect a predetermined change in the electric current; a microphone (130) configured to obtain notification sound that the electrical appliance emits within a predetermined sound recording period which starts when the predetermined change is detected; an apparatus's sound checking section (sound obtaining/checking section 154) configured to carry out a determination of the state of the electrical appliance from the notification sound; and a transmitting section (communication section 140) configured to transmit report information, which is indicative of a result of the determination, to an external apparatus.

According to the above configuration, the monitoring apparatus is capable of determining the state of the electrical appliance and sending report information, which is indicative of the result of the determination, to an external apparatus. For example, if the monitoring apparatus has succeeded in determining the state of the electrical appliance, the monitoring apparatus sends the report information to a server, whereas, if the monitoring apparatus has failed to determine the state of the electrical appliance, the monitoring apparatus sends, to the server, the audio data obtained by the microphone and containing the notification sound. This eliminates the need for transmitting every audio data to the sever, and thus reduces the amount of data communication. Alternatively, the monitoring apparatus may send the report information to the communication terminal. This eliminates the need for sending the report information to the communication terminal via the server, and thus reduces the amount of data communication.

A server (200) in accordance with Aspect 7 of the present invention is a server (200) for receiving, from the monitoring apparatus (100) described in any of Aspects 2 to 6, audio data containing a notification sound emitted by an electrical appliance (400), the server (200) including; a sound checking section (232) configured to carry out determination of a state of the electrical appliance from the notification sound emitted by the electrical appliance and contained in the audio data; and a determination result reporting section (233) configured to send report information, which is indicative of a result of the determination, to a communication terminal (300) associated with the monitoring apparatus.

According to the above configuration, the server is capable of determining the state of the electrical appliance from audio data that has been received from the monitoring apparatus and that contains a notification sound emitted by the electrical appliance. With this configuration, the determination by the server can be carried out by checking only sounds that are assumed to be emitted when the electrical appliance transitions from operating state to standby state. This brings about an effect of making it possible to provide a very convenient server in which only a reduced number of kinds of sound needs to be checked to determine the state of an electrical appliance and which thereby has an improved processing efficiency.

A server (200) in accordance with Aspect 8 of the present invention may be configured such that, based on Aspect 7, the determination result reporting section (233) is configured to, if the sound checking section (232) has failed to determine the state, transmit the audio data to the communication terminal (300).

According to the above configuration, the server is configured to (i) send, to the communication terminal, report information indicative of the result of the determination if the server has succeeded in determining the state of the electrical appliance and (ii) transmit the audio data to the communication terminal if the server has failed to determine the state of the electrical appliance. This allows a user to know the state of the electrical appliance either from the report information indicative of the result of the determination or from the audio data.

A server (200) in accordance with Aspect 9 of the present invention may be configured such that, based on Aspect 8: the determination of the state of the electrical appliance from the notification sound emitted by the electrical appliance, the determination being carried out by the sound checking section (232), is carried out by referencing information (sound pattern database 222) indicative of associations between possible sound patterns of the notification sound emitted by the electrical appliance (400) and respective corresponding states of the electrical appliance, the information being stored in a memory section (220); and the server (200) is configured such that, when the server (200) has received, from the communication terminal, report information that is to be associated with the audio data which has been sent from the determination result reporting section (233) to the communication terminal (300), the server (200) stores, into the memory section, the report information and a sound pattern of the notification sound contained in the audio data in association with each other.

According to the above configuration, the server is configured such that, if the server has failed to determine the state of the electrical appliance from the notification sound contained in the audio data, the server receives report information from the communication terminal to which the audio data has been sent, and stores the report information and a sound pattern of the notification sound contained in the sent audio data in association with each other. This achieves the following: if the server receives audio data containing the same notification sound from the monitoring apparatus in the future, the server will send, to the communication device, the report information stored in association with that notification sound. The report information here serves as the "report information indicative of the result of the determination".

A monitoring method in accordance with Aspect 10 of the present invention is a monitoring method for use in a monitoring apparatus (100) for detecting a state of an electrical appliance (400) which is to be monitored, the method including: an electric current measuring step (S1) including measuring electric current consumed by the electrical appliance; an electric current change detecting step (S3) including detecting a predetermine change in the electric current; a notification sound obtaining step (S4) including obtaining a notification sound that the electrical appliance emits within a predetermined sound recording period which starts when the predetermined change is detected; and a transmitting step (S8) including transmitting audio data containing the notification sound to a server. This configuration brings about the same effects as Aspect 2.

The monitoring apparatus in accordance with any of the aspects of the present invention may be realized by a computer. In a case where the monitoring apparatus is realized by a computer, the present invention encompasses: a control program for the monitoring apparatus which program causes the computer to operate as the foregoing sections (software elements) of the monitoring apparatus so that the monitoring apparatus can be realized by the computer; and a computer-readable storage medium storing the control program therein.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Monitoring system
100 Monitoring apparatus
110 Connection terminal
120 Memory section
130 Microphone
140 Communication section (transmitting section)
150 Control section
151 Electric current measuring section
152 Electric current change detecting section
153 Sound obtaining section
154 Sound obtaining/checking section (apparatus's sound checking section)
200 Server
210 Communication section
220 Memory section
221 Recorded audio data database
222 Sound pattern database
223 Report destination information database
300 Communication terminal
400 Electrical appliance

The invention claimed is:

1. A monitoring system for monitoring a state of an electrical appliance which is to be monitored, the monitoring system comprising:
a monitoring apparatus configured to (i) measure electric current consumed by the electrical appliance and (ii) obtain a notification sound that the electrical appliance emits within a predetermined sound recording period which starts when a predetermined change in the electric current is detected,
the monitoring system being configured to carry out a determination of the state of the electrical appliance from the notification sound obtained by the monitoring apparatus and send report information, which is indicative of a result of the determination, to a communication terminal associated with the monitoring apparatus.

2. A monitoring apparatus for detecting a state of an electrical appliance which is to be monitored, the monitoring apparatus comprising:
an electric current measuring section configured to measure electric current consumed by the electrical appliance;
an electric current change detecting section configured to detect a predetermined change in the electric current;
a microphone configured to obtain a notification sound that the electrical appliance emits within a predetermined sound recording period which starts when the predetermined change is detected; and
a transmitting section configured to transmit audio data containing the notification sound to a server.

3. The monitoring apparatus according to claim 2, wherein the electric current change detecting section is configured to determine that the predetermined change has occurred if, after the electric current change detecting section has detected that the electric current is equal to or greater than a first threshold, the electric current change detecting section has detected that the electric current is equal to or less than a second threshold which is less than the first threshold.

4. The monitoring apparatus according to claim 2, wherein the electric current change detecting section is configured to determine that the predetermined change has occurred if, after the electric current change detecting section has detected that the electric current is equal to or greater than a first threshold, the electric current change detecting section has detected that the electric current has been equal to or less than a second threshold for a predetermined duration, the second threshold being less than the first threshold.

5. The monitoring apparatus according to claim 2, wherein the electric current change detecting section is configured to use configuration information to detect the predetermined change, the configuration information being updatable with information obtained from the sever.

6. A server for receiving, from the monitoring apparatus recited in claim 2, audio data containing a notification sound emitted by an electrical appliance, the server comprising:
   a sound checking section configured to carry out a determination of a state of the electrical appliance from the notification sound emitted by the electrical appliance and contained in the audio data; and
   a determination result reporting section configured to send report information, which is indicative of a result of the determination, to a communication terminal associated with the monitoring apparatus.

7. The server according to claim 6, wherein the determination result reporting section is configured to, if the sound checking section has failed to determine the state, transmit the audio data to the communication terminal.

8. The server according to claim 7, wherein:
   the determination of the state of the electrical appliance from the notification sound emitted by the electrical appliance, the determination being carried out by the sound checking section, is carried out by referencing information indicative of associations between possible sound patterns of the notification sound emitted by the electrical appliance and respective corresponding states of the electrical appliance, the information being stored in a memory section; and
   the server is configured such that, when the server has received, from the communication terminal, report information that is to be associated with the audio data which has been sent from the determination result reporting section to the communication terminal, the server stores, into the memory section, the report information and a sound pattern of the notification sound contained in the audio data in association with each other.

9. A monitoring apparatus for detecting a state of an electrical appliance which is to be monitored, the monitoring apparatus comprising:
   an electric current measuring section configured to measure electric current consumed by the electrical appliance;
   an electric current change detecting section configured to detect a predetermined change in the electric current;
   a microphone configured to obtain a notification sound that the electrical appliance emits within a predetermined sound recording period which starts when the predetermined change is detected;
   an apparatus's sound checking section configured to carry out a determination of the state of the electrical appliance from the notification sound; and
   a transmitting section configured to transmit report information, which is indicative of a result of the determination, to an external apparatus.

10. A monitoring method for use in a monitoring apparatus for detecting a state of an electrical appliance which is to be monitored, the method comprising:
   an electric current measuring step comprising measuring electric current consumed by the electrical appliance;
   an electric current change detecting step comprising detecting a predetermined change in the electric current;
   a notification sound obtaining step comprising obtaining a notification sound that the electrical appliance emits within a predetermined sound recording period which starts when the predetermined change is detected; and
   a transmitting step comprising transmitting audio data containing the notification sound to a server.

* * * * *